Sept. 5, 1967 J. STONE 3,339,309

HORTICULTURAL BLANKET

Filed Dec. 28, 1965

INVENTOR
JACK STONE
BY John Howard Pearson
ATTORNEY

United States Patent Office 3,339,309
Patented Sept. 5, 1967

3,339,309
HORTICULTURAL BLANKET
Jack Stone, "Lynden," Prestbury Road,
Wilmslow, England
Filed Dec. 28, 1965, Ser. No. 516,940
2 Claims. (Cl. 47—29)

The invention proposes what may be termed as a horticultural blanket for the protection of growing crops against frost in cold weather and for protection of crops against excessive heat in hot weather. The appliance is intended for use by gardeners, allotment holders and the like, and can be used both for the protection of crops in the ground and as a shield or heat screen on the roofs and walls of greenhouses, hot houses, cold frames and so on.

The great need of growing crops is light and the present invention allows of the maximum light reaching the crops whilst at the same time providing thermal insulation against excessive cold on the one hand and heat on the other. For the user a principal consideration is weight and the invention provides the desired thermal insulation in forms of extreme lightness of weight.

The structure according to the present invention comprises a lay-flat tube of two or more layers of a transparent synthetic plastic film or pellicle sealed together discontinuously over the meeting surface thereof and continuously around the ends in the case of a tube or near their edges in the case of superimposed layers, thereby to constitute an inflatable blanket. There is provided also a means for introducing air into the sealed space within the tube or between two layers thereby to inflate the structure and for sealing that space when inflated, the structure thus defining an inflated transparent blanket or cover, which blanket or cover may or may not have a quilted effect which can be laid upon growing crops, seed beds and the like or on the roof of a greenhouse (at the interior or exterior thereof), or elsewhere for use as a transparent thermal insulation.

The structure provides a two-way insulation and, therefore, can be used to regulate loss of heat from and application of heat to the surfaces being covered. The improved blanket has extreme lightness of weight and, therefore, imposes no strain on the user, nor has it the effect of crushing any young crops upon which it may be laid. Loops, tapes, eyelets or the like may be provided around the edges of the blanket (and possibly at other points also), so that it may be fastened in position relative to the surface being protected, by peg-like means, passing through eyelets, or grommets, such as pegs in the ground or to hooks or clips or the like on a greenhouse frame, for support or to resist the effect of strong winds.

The finished product is ready for use, when inflated either by human or by mechanical means, and can easily be placed over greenhouses, cold frames or ground surfaces, or it may be arranged to form cloches or the like to prevent frost damage. In hot weather the device can be used as a cooling insulator for greenhouses, cold frames and the like.

The invention will be described further, by way of example, with reference to the accompanying drawings illustrating one embodiment thereof, and in which:

FIG. 1 is a perspective view of a heat insulating structure according to the invention, in use in covering a seed bed or the like;

Figure 1:
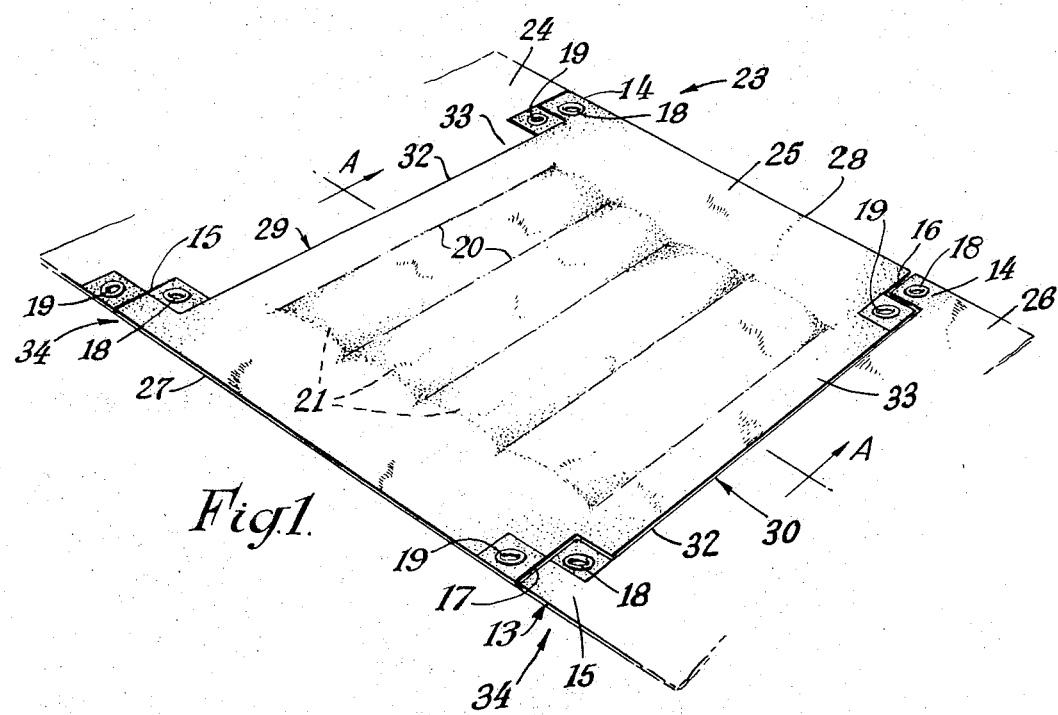
Figure 2:
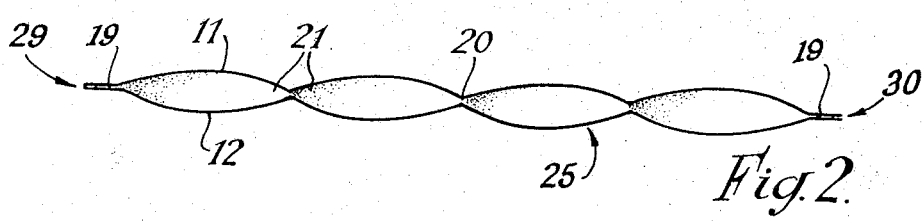
FIG. 2 is a section on line A—A of FIG. 1.
Figure 3:
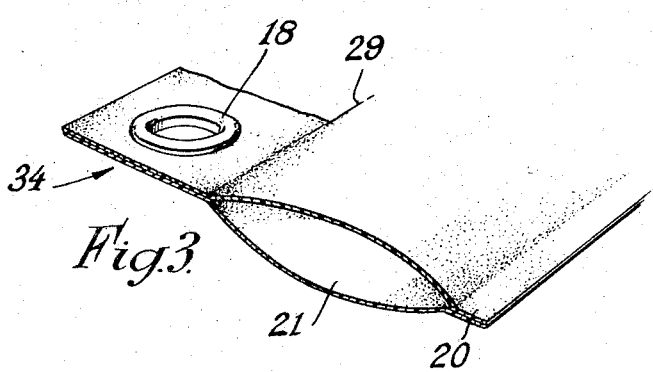
FIG. 3 is an enlarged perspective view of a part of the structure shown in FIG. 1.

Referring now to the drawings, and in particular to FIGS. 1 and 2 thereof, a heat insulating structure comprises superimposed generally rectangular layers 11, 12 of a flexible plastic material disposed one upon another and secured together around their edges, inflation means 13 through which air is introduced into the interior of the structure and tab, or tongue, members 14, 15 to facilitate the joining together of a plurality of such structures and/or the location thereof, relative to a surface to be covered.

The flexible plastics material which constitutes the layers 11, 12 is preferably polyvinyl chloride sheet having good flexibility at low temperatures and a high degree of transparency and, furthermore, being stable to ultra-violet radiation. I have found that a suitable material is that sold under the tradename "Guttagena," such material being glass-clear, strong, stable and resistant to water and atmospheric gases. The light absorption of "Guttagena" is minimal and thus there would be little, if any, significant reduction in light intensity due to the material. There would, however, be a slight reduction in light intensity due to refraction through a system.

Each layer of PVC is of generally rectangular form and one of two opposite laterally extending end edges thereof is formed with the tabs 14, 15, the opposite, laterally extending end edge being formed with complementary cut-outs 16, 17. The tabs 14, 15 both present eyelets 18 for attachment purposes and one such tab, that is to say tab 15, further includes the inflation means 13, which means (not shown in detail) takes the form of a closable aperture in the structure. Adjacent to the edge in which the cut-outs 16, 17 are formed, two further eyelets 19 are provided. The layers 11, 12 are joined together around the edges in any convenient manner, for example, by conventional high frequency welding, and the tabs 14, 15 and eyelets 18, 19 are formed simultaneously with such operation. In addition the layers 11, 12 are sealed together at spaced intervals thereover so as to give join lines 20 which define parallel, interconnected tubular compartments 21. The layers 11, 12 may be sealed together by a series of broken lines or alternatively by a series of welds, the former arrangement giving rise to a quilted effect in the finished product and the latter to a "dimpled" effect. In use one or more of the inflatable structures is or are placed in position relative to the surface to be protected and are secured in such position and to each other by utilising the eyelets in the tabs.

As shown in FIGURE 1, an elongated, horticultural structure 23, of extreme lightness in weight, is achieved by this invention, the structure 23 being adapted to rest on, and cover growing crops to transmit sunlight while providing heat insulation. Structure 23 is free of water balast or skeletonized, semi-rigid framing and is not held in position by covering the edges with dirt, as in prior art devices, most of which are supported on the ground, rather than on the growing crops, and would unduly crush such crops.

Structure 23, includes a plurality of identical, generally rectangular, thin, inflatable enclosures 24, 25 and 26, laid end to end and each of predetermined area to cover a crop row of any desired length. The opposite longitudinal edges 27 and 28 of each enclosure blanket, or inflatable sheet, such as 25, are in longitudinal alignment with the adjacent enclosures and the opposite lateral edges 29 and 30 overlap, abut and mate with the corresponding edges of adjacent enclosures.

The pair of longitudinally projecting tabs, or tongues, 14 and 15 of the enclosure, are spaced apart by a space, or cut-out 32, cut-out 32 receiving the single, relatively wide, tab, or tongue, 33 of the next successive enclosure, thereby constituting the tongue means 34 of the invention.

It will be apparent that when the enclosures 24, 25 and 26 are laid in position, inflated and peg-like means placed in the eyelets 18, the overlapping tongue means 34 at each end of each abutting neclosure will tend to prevent displacement of the light weight structure by winds and to avoid arching or ballooning on lateral bend lines, while the transversely extending, tubular compartments 21 will tend to avoid arching or ballooning on longitudinal bend lines.

It should also be noted that the eyelets 18 at one end of each enclosure are longitudinally misaligned, or laterally displaced from the eyelets 19 at the other end thereof, thereby permitting one enclosure to be arched into cloche form by movement of its pegs, without disturbing the adjacent lay-flat enclosures.

Whilst the device is intended primarily for horticultural uses, as set out above, it may also be utilised as an inflatable packing material or as a thermal insulation on the top of ceilings or similar parts of domestic or industrial buildings.

It is an advantage of the improved blanket that is can, when deflated, be folded or rolled to occupy the minimum of space and to facilitate handling.

What I claim is:

1. An elongated, horticultural blanket, of extreme lightness in weight, for resting on, and covering, growing crops to provide sunlight transmission and heat insulation, said structure comprising:

a plurality of identical lay-flat, air inflatable enclosures each of relatively thin, generally rectangular configuration for covering a predetermined area of said crops, each formed of two layers of transparent synthetic, light weight plastic film material sealed around the edges thereof and sealed discontinuously over the meeting surfaces thereof to each other, to form one of said enclosures;

tongue means projecting longitudinally from each opposite end of each said enclosure for mating in juxtaposition, with said tongue means on adjacent enclosures, when said enclosures are positioned end to end to cover an elongated row of crops;

said tongue means comprising a pair of longitudinally projecting tabs each on an opposite side of one end of each said enclosure, separated by a relatively wide tab space and a single longitudinally projecting tab centrally of the opposite end of each said enclosure, said opposite end having tab spaces each on an opposite side thereof for receiving the pair of tabs of the next successive enclosure;

inflation means on each said enclosure for individually inflating the same with air;

and eyelet means, proximate each of the four corners of each said rectangular enclosure for receiving peg-like anchoring means to resist the effect of strong winds while retaining the extremely light characteristic of said blanket.

2. An elongated blanket as specified in claim 1 wherein:

one of said pair of tabs includes said inflation means on a portion thereof;

said eyelet means comprises a first pair of eyelets, one alongside said inflation means on said one tab and the other on the other tab of said pair and a second pair of eyelets, each proximate one of said tab spaces at said other end of said enclosure;

the portion of said tab including said inflation means being free of eyelets to permit access thereto for applying air to the interior of said enclosure after said eyelets are anchored by said peg-like anchoring means.

References Cited

UNITED STATES PATENTS

| | | | |
|---|---|---|---|
| 2,731,652 | 1/1956 | Bishop | 5—348 |
| 3,008,214 | 11/1961 | Foster et al. | 5—348 |
| 3,112,956 | 12/1963 | Schick et al. | 5—348 |
| 3,181,455 | 5/1965 | Gouker et al. | 47—9 |
| 3,206,892 | 10/1965 | Telkes et al. | 47—29 |

FOREIGN PATENTS 205,009    11/1956    Australia.

ABRAHAM G. STONE, *Primary Examiner.*

ANTONIO F. GUIDA, P. A. RAZZANO,
    *Assistant Examiners.*